US012798986B2

(12) United States Patent
Park

(10) Patent No.: US 12,798,986 B2
(45) Date of Patent: Nov. 17, 2026

(54) METHOD FOR PRODUCING HIGH-PURITY LITHIUM CARBONATE BY RECOVERING LITHIUM FROM LITHIUM-ION SECONDARY BATTERY SCRAP AND A LITHIUM CARBONATE PRODUCED THEREBY

(71) Applicant: JaeYoungTech., LTD., Gumi-si (KR)

(72) Inventor: Jae Ho Park, Daegu (KR)

(73) Assignee: Jae YoungTech., LTD., Gumi-si (KR)

( * ) Notice: Subject to any disclaimer, the term of this patent is extended or adjusted under 35 U.S.C. 154(b) by 535 days.

(21) Appl. No.: 18/425,531

(22) Filed: Jan. 29, 2024

(65) Prior Publication Data

US 2025/0136459 A1 May 1, 2025

(30) Foreign Application Priority Data

Oct. 31, 2023 (KR) ........................ 10-2023-0147966

(51) Int. Cl.
*C01D 15/08* (2006.01)
*B01D 15/36* (2006.01)

(52) U.S. Cl.
CPC ........... *C01D 15/08* (2013.01); *B01D 15/361* (2013.01); *C01P 2002/72* (2013.01); *C01P 2004/03* (2013.01); *C01P 2006/80* (2013.01)

(58) Field of Classification Search
None
See application file for complete search history.

(56) References Cited

U.S. PATENT DOCUMENTS

| | | | | |
|---|---|---|---|---|
| 8,574,519 B2 * | 11/2013 | Harrison | C01B 35/063 | 423/422 |
| 10,035,710 B2 * | 7/2018 | Kawata | C01D 15/08 | |
| 2012/0100056 A1 * | 4/2012 | Harrison | C01B 35/063 | 423/276 |
| 2022/0274841 A1 * | 9/2022 | Rohde | C22B 3/12 | |
| 2025/0167327 A1 * | 5/2025 | Kumar | C22B 23/0476 | |
| 2025/0282632 A1 * | 9/2025 | Yoo | C01D 15/08 | |

FOREIGN PATENT DOCUMENTS

| | | |
|---|---|---|
| JP | 2022-036933 A | 3/2022 |
| KR | 10-1682217 B1 | 12/2016 |
| KR | 10-2022-0026285 A | 3/2022 |
| KR | 10-2471527 B1 | 11/2022 |

* cited by examiner

*Primary Examiner* — John J Figueroa
(74) *Attorney, Agent, or Firm* — Studebaker Brackett PLLC

(57) ABSTRACT

Provided is a method for producing high-purity lithium carbonate by recovering lithium from lithium-ion secondary battery scrap, comprising: a process of roasting lithium-ion secondary battery scrap powder; a process of wet grinding; a process of carbon dioxide water leaching; a process of filtering the leached lithium bicarbonate solution; a process of purifying using an ion exchange resin; a process of synthesizing lithium carbonate by thermal decomposition of the leached lithium bicarbonate; a process of filtering lithium carbonate solution and separating it into a solid phase lithium carbonate and a liquid phase second lithium carbonate filtrate.

5 Claims, 7 Drawing Sheets x500 x3,000 x10,000

METHOD FOR PRODUCING HIGH-PURITY LITHIUM CARBONATE BY RECOVERING LITHIUM FROM LITHIUM-ION SECONDARY BATTERY SCRAP AND A LITHIUM CARBONATE PRODUCED THEREBY

CROSS-REFERENCE TO RELATED APPLICATIONS

This application claims the priority of Korean Patent Application No. 10-2023-0147966, filed on Oct. 31, 2023, the entire contents of which are hereby incorporated by reference.

BACKGROUND OF THE INVENTION

The present invention disclosed herein relates to a method of producing high-purity lithium carbonate by recovering lithium from lithium-ion secondary battery scrap through a carbon dioxide water leaching process, a purification process using an ion exchange resin, and a thermal decomposition process, and the lithium carbonate produced thereby.

Lithium-ion secondary batteries are widely used in various fields such as electric vehicles, energy storage systems (ESS), smartphones, satellites, and solar tube batteries. As the demand for lithium-ion secondary batteries increases, the amounts of used lithium secondary batteries and waste scrap that occur in the manufacturing process also increase day by day.

Due to the rapid growth of the electric vehicle market, the value of key minerals such as lithium (Li), nickel (Ni), cobalt (Co), and manganese (Mn) in cathode materials for lithium-ion secondary batteries have also risen sharply, leading to a severe competition to secure resources such as resource nationalism of resource-rich countries and internalization of a supply chain in each country. In addition, due to global environmental protection trends such as carbon neutrality and strengthening environmental regulations, the demand for eco-friendly processes, eco-friendly materials, and eco-friendly products, as well as the importance of reusing and recycling waste, are increasing. Due to this trend, the recycling market of waste lithium secondary batteries is also expected to receive great attention and grow.

The value of lithium, one of the key minerals of lithium-ion secondary batteries has increased over the past few years. The content of lithium in cathode material is 5 to 7%. The methods of recovering lithium compounds through recycling are taking great attention.

Currently, South Korea relies entirely on imports of lithium carbonate, a key raw material for lithium-ion secondary batteries. As the demand for batteries grows, recycling of key raw materials such as Li, Ni, Co, and Mn becomes essential. Furthermore, it is important to secure competitiveness for recycling technology by increasing the recovery rate of lithium in a more environment-friendly method to respond to resource weaponization and protect the global environment.

Conventional methods for recovering and synthesizing lithium include recovering lithium from waste liquid generated in the process of separating Ni, Co, and Mn components from lithium-ion secondary battery scrap. This is a method of recovering and synthesizing lithium through a process using solvents and acids by mixing waste liquid containing lithium with diluents and extractants. This method involves several steps using solvents, diluents, extractants, and acids and needs a large amount of water and energy, resulting in significant losses in terms of financial aspect and time. In addition, most lithium recycling companies produce industrial lithium carbonate with a purity of less than 99.5%, which has a high content of impurities such as sodium (Na) and sulfur(S) in the final product due to the auxiliary materials used during the process.

Accordingly, after repeated research, the present researchers confirmed that by applying the carbon dioxide water leaching process and the purification process using ion exchange resin, high-purity lithium carbonate of more than 99.5% that can be directly used in the battery manufacturing process can be produced, and the present invention was completed.

PRIOR ART DOCUMENT

Patent Document (Patent Document 0001) Korea Patent Publication No. 10-2022-0026285 (2022 Mar. 4)

(Patent Document 0002) Korea Patent No. 10-1682217 (2016 Nov. 28)

SUMMARY OF THE INVENTION

The present invention provides a method for producing high-purity lithium carbonate by recovering lithium from lithium-ion secondary battery scrap, and lithium carbonate produced thereby.

The one aspect of the present invention provides a method for producing high-purity lithium carbonate by recovering lithium from lithium-ion secondary battery scrap, comprising: (1) a process of roasting lithium-ion secondary battery scrap powder by maintaining it at 600 °C to 1,000 °C for 100 to 300 minutes in reducing atmosphere; (2) a process of wet grinding the roasted product at 25 °C to 30 °C; (3) a process of converting a first lithium carbonate into lithium bicarbonate by water leaching the wet grinding result while adding carbon dioxide to produce a leached lithium bicarbonate solution in which the lithium bicarbonate is dissolved; (4) a process of filtering the leached lithium bicarbonate solution to produce a filtered lithium bicarbonate solution; (5) a process of purifying the filtered lithium bicarbonate solution using a polystyrene-based ion exchange resin at a flow rate of 5 to 10 liters per hour to remove impurities other than lithium to produce a purified lithium bicarbonate solution; (6) a process of synthesizing a second lithium carbonate by thermally decomposing the lithium bicarbonate in the purified lithium bicarbonate solution at a temperature of 80 to 100 °C while stirring at 60 to 400 rpm; and (7) a process of filtering a second lithium carbonate solution containing the second lithium carbonate and separating the second lithium carbonate solution into a solid phase second lithium carbonate and a liquid phase second lithium carbonate filtrate.

In some embodiments, reusing the second lithium carbonate filtrate as process water in steps (2) and (3).

In other embodiments, the temperature of the process water is 5 °C to 45 °C.

In still other embodiments, the purity of the solid second lithium carbonate is 99.5% or more.

The other aspect of the present invention provides a high-purity lithium carbonate produced according to claim 1.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention. In the drawings.

DETAILED DESCRIPTION OF PREFERRED EMBODIMENTS

Figure 1:
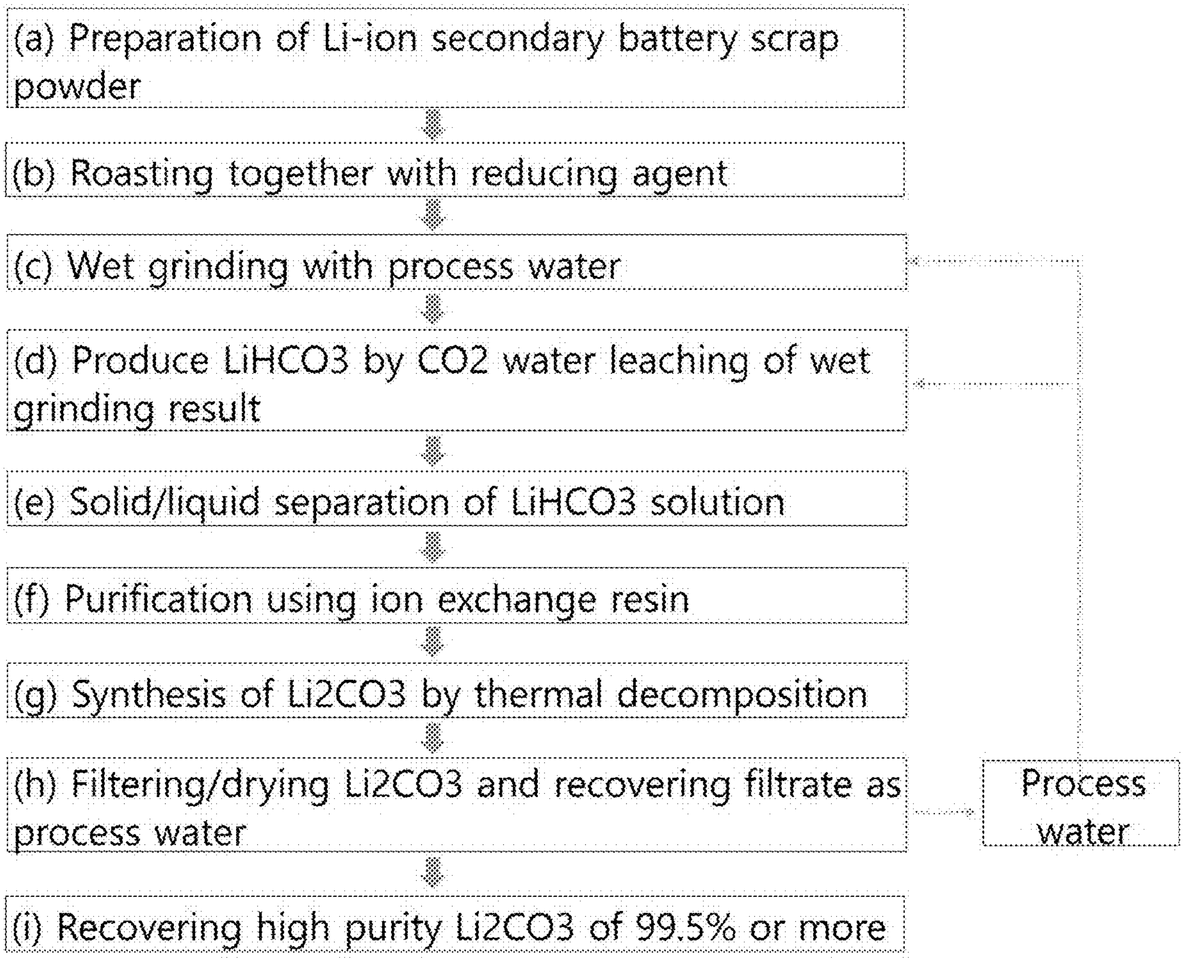
FIG. 1 is a flow chart of a method for producing high-purity lithium carbonate by recovering lithium from lithium-ion secondary battery scrap according to an embodiment of the present invention.

Hereinafter, preferred embodiments of the present invention will be described with reference to the accompanying drawings. Embodiments of the present invention may be modified into various other forms, and the scope of the present invention is not limited to the embodiments described below. Embodiments of the present invention are provided to explain the present invention more completely to those skilled in the art to which the present invention belongs. Accordingly, the shapes and sizes of elements in the drawings may be exaggerated for clear explanation, and elements indicated by the same symbol in the drawings are the same element. In the present invention, the expression first or second does not mean order or importance but is simply used to distinguish components.

The present invention relates to a method for producing high-purity lithium carbonate by recovering lithium from lithium-ion secondary battery scrap, and to the high-purity lithium carbonate produced thereby.

Figure 2:
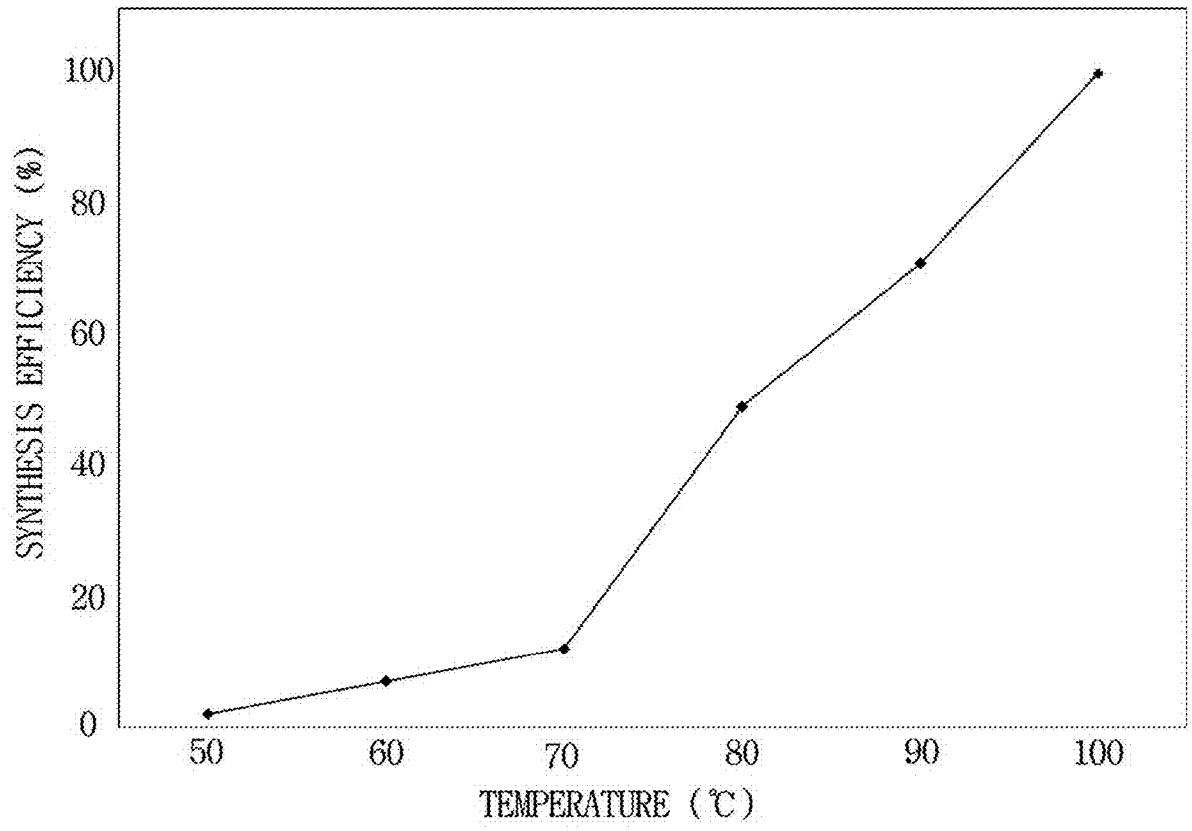
FIG. 2 is a graph showing a change in the synthesis efficiency of lithium carbonate according to the temperature of a purified lithium bicarbonate solution according to an embodiment of the present invention.
Figure 3:
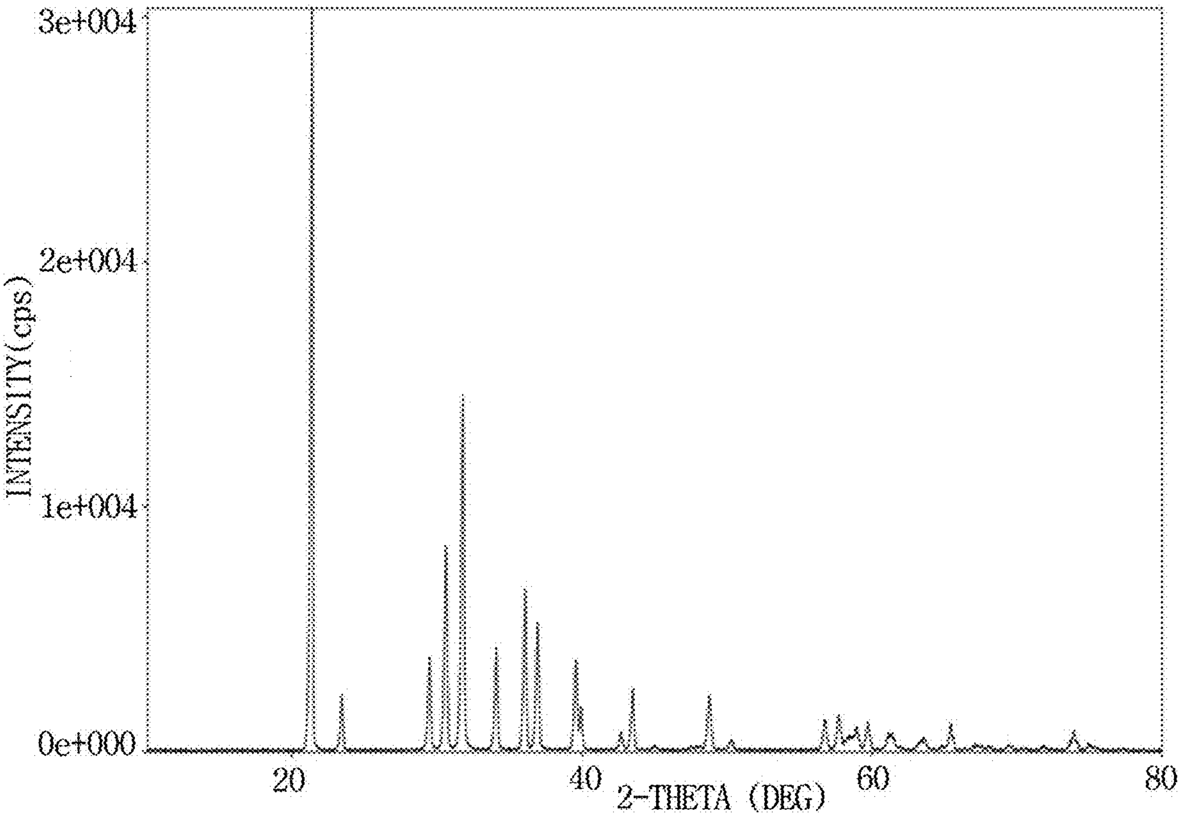
FIG. 3 is a graph showing the results of XRD analysis of lithium carbonate finally obtained according to one embodiment of the present invention.
Figure 4:
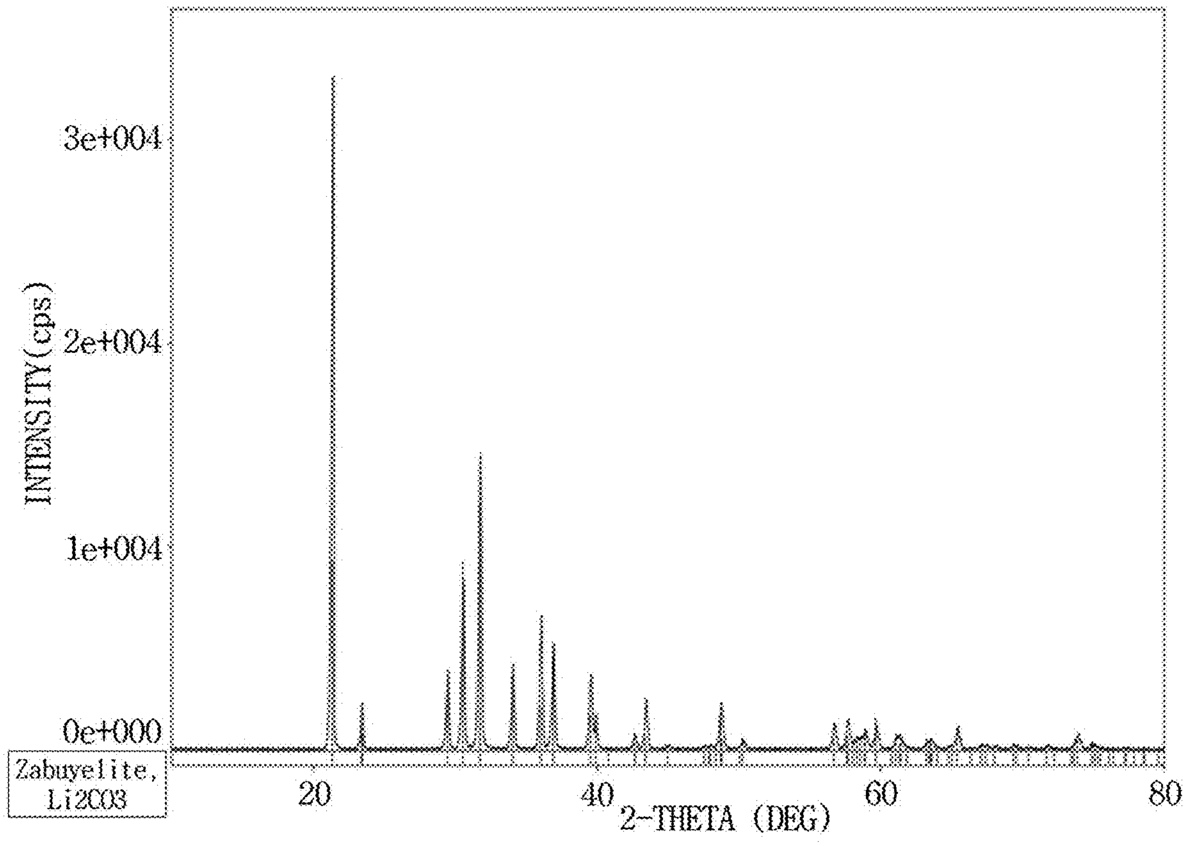
FIG. 4 is a graph showing the results of XRD analysis of battery-grade lithium carbonate from lithium minerals.
Figure 5A:
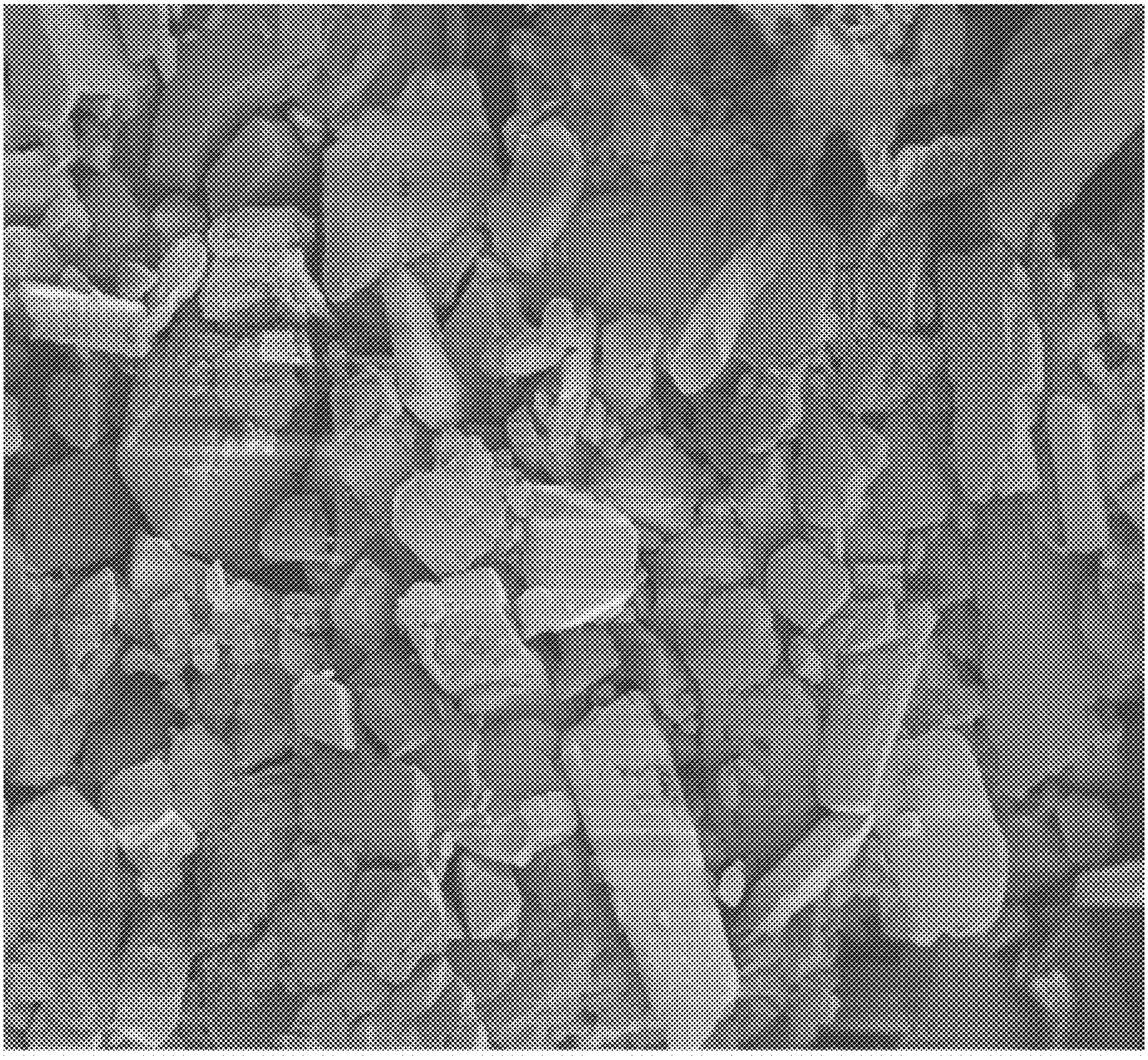
FIGS. 5A, 5B and 5C are scanning electron microscope (SEM) images of lithium carbonate finally obtained according to one embodiment of the present invention.
Figure 5B:
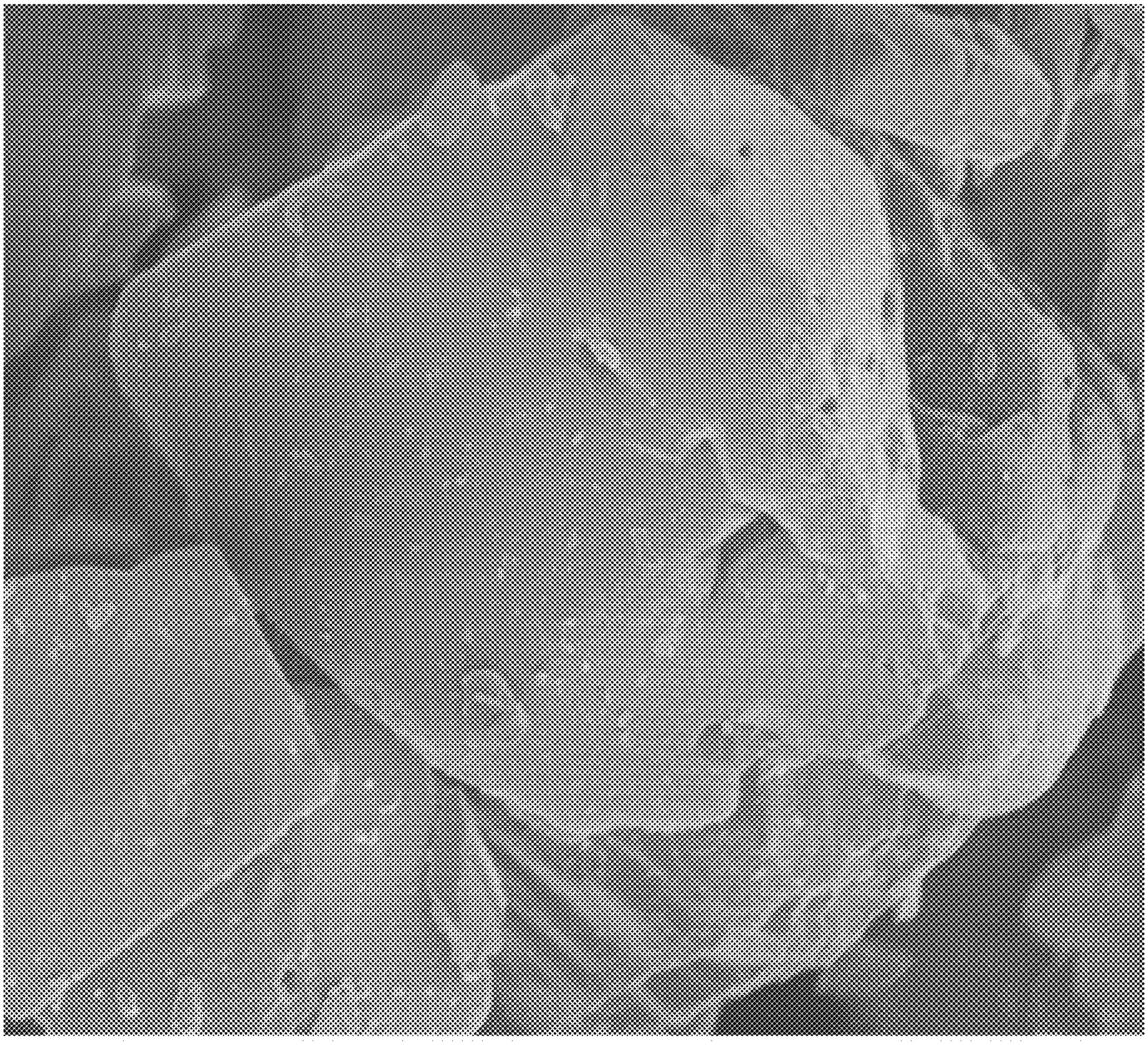
Figure 5C:
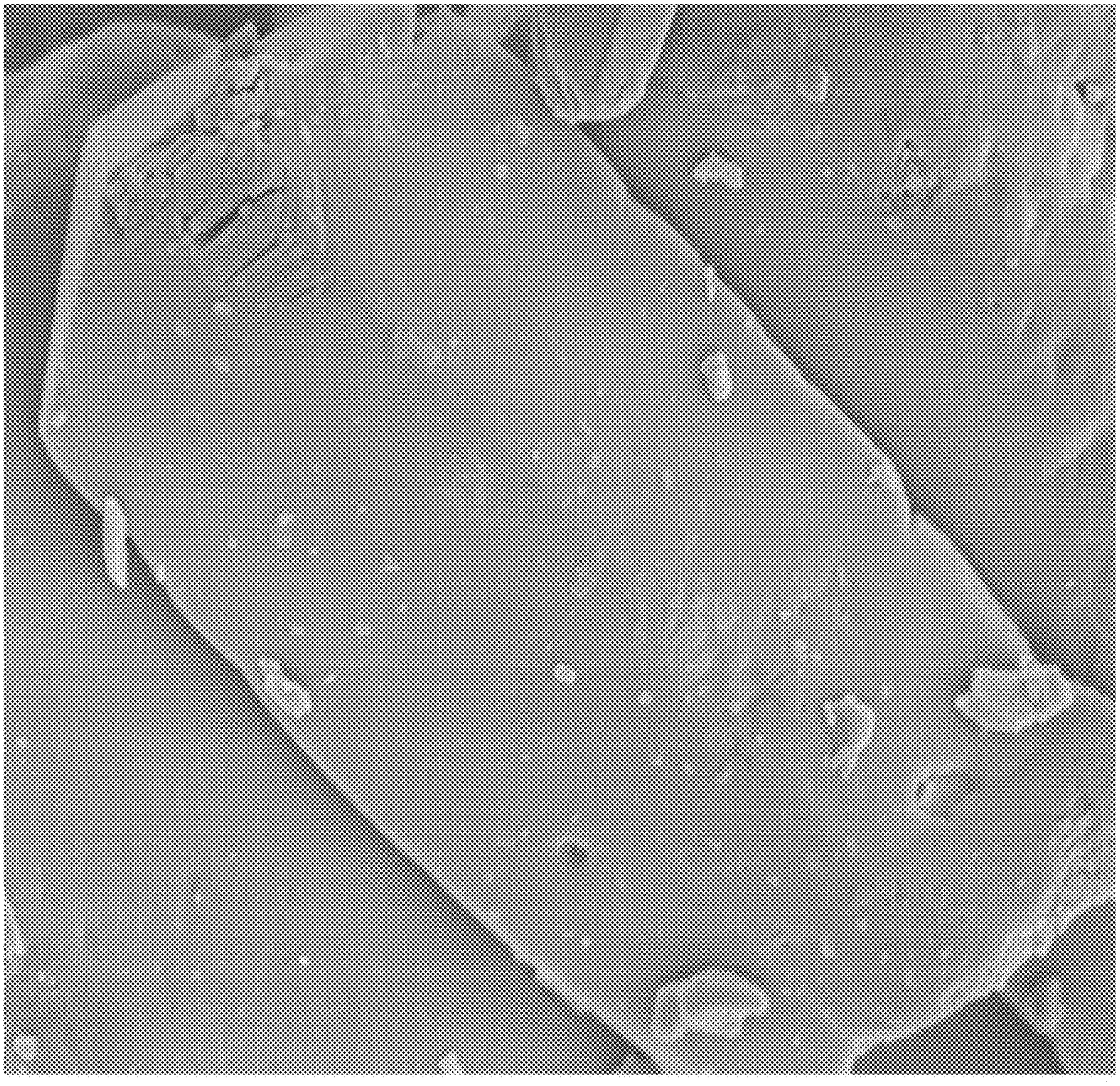

FIG. 1 is a flow chart of a method for producing high-purity lithium carbonate by recovering lithium from lithium-ion secondary battery scrap according to an embodiment of the present invention. FIG. 2 is a graph showing a change in the synthesis efficiency of lithium carbonate according to the temperature of a purified lithium bicarbonate solution according to an embodiment of the present invention. FIG. 3 is a graph showing the results of XRD analysis of lithium carbonate finally obtained according to one embodiment of the present invention. FIG. 4 is a graph showing the results of XRD analysis of battery-grade lithium carbonate from lithium minerals. FIGS. 5A, 5B and 5C are scanning electron microscope (SEM) images of lithium carbonate finally obtained according to one embodiment of the present invention. With reference to FIG. 1, the process will be described in order.

First, lithium-ion secondary battery scrap powder can be prepared (step a).

Lithium-ion secondary battery scrap powder may include powder obtained from scrap of lithium-ion secondary batteries discarded after use, as well as powder generated during the production of lithium-ion secondary battery cathode active material.

As a lithium-ion secondary battery scrap, lithium cobalt oxide (LiCoO2), lithium nickel cobalt manganese oxide (LiNiCoMnO2), lithium manganese oxide (LiMnO2), and lithium iron phosphate (LiFePO4) can be used individually or in combination. However, it is not limited to this.

For example, lithium-ion secondary battery scrap powder may contain essentially metals such as nickel (Ni), cobalt (Co), manganese (Mn), and lithium (Li), while also containing impurity metals such as aluminum (Al), iron (Fe), and copper (Cu) and carbon.

Specifically, a scrap powder containing lithium nickel cobalt manganese oxide (LiNixCoyMn1-x-yO2) can be used as the lithium-ion secondary battery scrap powder. The composition of the scrap powder is 10 to 50 parts by weight of Ni, 5 to 20 parts by weight of Co, 5 to 20 parts by weight of Mn, 2 to 8 parts by weight of Li, 0.5 to 5 parts by weight of Co, and 0.5 to 5 parts by weight of Al, 0.5 to 5 parts by weight of Fe, and 0.5 to 5 parts by weight of other impurities, with reference to 100 parts by weight of the total weight of the scrap powder.

Next, lithium-ion secondary battery scrap powder can be mixed with a reducing agent and roasted in a nitrogen atmosphere (step b).

In the process of manufacturing cathode materials for lithium-ion secondary batteries, complex processes such as baking, addition of carbon and other metal oxides, and heat fusion after the addition of binders are required to maintain or improve battery characteristics. For this reason, waste cathode materials contain valuable metals and impurities in the form of various oxides, which can act as an inhibitor in the recovery of valuable metals. To eliminate these inhibitory factors, a reducing agent is added to lithium-ion secondary battery scrap powder and roasted at high temperatures. Thus, the binder added during the production of the cathode material can be removed and the metallic substances combined with oxygen can be reduced.

The reaction mechanism of the roasting process is as follows.

$$2LiMeO2+2C \rightarrow Li2CO3+2Me+CO2$$

where, Me=Ni, Co, Mn.

Carbon-based powder can be used as a reducing agent. Activated carbon can be used as a carbon-based powder. Activated carbon powder can react with lithium to maximize the recovery rate of lithium.

In the roasting process, 10 to 50 parts by weight of the reducing agent can be mixed with 100 parts by weight of lithium-ion secondary battery scrap powder.

A rotary or non-rotary kiln may be used in the roasting process, but it is preferable to use a rotary kiln because the rotary kiln can accelerate the roasting reaction.

The roasting process can be performed by maintaining the temperature at 600 °C to 1,000 °C for 100 to 300 minutes (isothermal section). While the roasting process is in progress, nitrogen (N2) gas can be introduced to maintain a reducing atmosphere. The high-temperature roasting process promotes the decomposition of binders. Scrap powder and reducing agent can react with lithium to maximize the recovery rate.

After the roasting process (isothermal section) is completed, the furnace can be cooled for 300 to 500 minutes. There is no need to maintain a nitrogen atmosphere in the cooling section.

The roasted products obtained after the roasting process may contain components such as lithium carbonate, metallic substances, etc. Lithium carbonate generated in the roasting process can be referred to as the first lithium carbonate.

Next, the roasted products obtained in step (b) can go through a wet grinding process (step c).

The finer powder can be obtained from the wet grinding process than the dry grinding process during the same grinding time. There is no scattering or diffusion of powder from the wet grinding process compared to the dry grinding process, which can improve the workplace environment and workers' working conditions.

Wet grinding can be performed by putting the roasted product, alumina balls, and solvent together in a grinder (mill). A 93% alumina ($Al_2O_3$) ball can be used. Wet grinding may occur at a temperature of 25 °C to 30 °C.

Water (soft water) can be used as a solvent at an initial stage. Once the process has progressed, the filtrate (hereinafter referred to as 'process water') recovered in step (h) can be used instead of water (soft water). Since the process water contains some lithium, reusing the process water in this step can increase the concentration of lithium in the water leachate in step (d), thereby increasing the lithium recovery rate and reducing the amount of wastewater generated.

By going through this process, the roasted product obtained in step (b) can be transformed into a form that is easy to water leaching. In other words, water leaching efficiency can be significantly increased by increasing the specific surface area of the roasted product through wet grinding. Ultimately, the recovery rate of lithium can be significantly improved.

The wet grinding result obtained through this process can be subjected to a water leaching process without any purification or filtration.

Next, the wet grinding result can be leached with carbon dioxide water to obtain a leached solution (hereinafter referred to as 'leached lithium bicarbonate solution') (step d) (carbon dioxide water leaching process).

The carbon dioxide water leaching process can be performed by adding water (soft water) and carbon dioxide to the wet grinding result and then stirring it.

In the wet grinding result, lithium may exist in the form of lithium carbonate ($Li_2CO_3$). The solubility of lithium carbonate is about 2,300 ppm at room temperature. Lithium carbonate contained in the wet grinding result can be referred to as first lithium carbonate.

By adding carbon dioxide ($CO_2$) gas to the wet grinding result, lithium carbonate can be converted to lithium bicarbonate ($LiHCO_3$). The solubility of lithium bicarbonate is about 10,000 ppm at room temperature. By changing the first lithium carbonate into the form of lithium bicarbonate, a greater amount of lithium can be dissolved in the solvent. When lithium dissolved in the solvent is recovered later, the lithium recovery rate can be increased.

The addition of carbon dioxide can be accomplished through a method of aerating carbon dioxide gas. Unreacted carbon dioxide gas can be captured and re-injected into the process water. This can minimize carbon dioxide usage.

Water (soft water) can be used in the initial stage of the carbon dioxide water leaching process. Once the manufacturing process has progressed, the process water recovered in step (h) can be used instead of water (soft water). Process water may contain some lithium, so when it is reused in this step, the concentration of lithium in the leachate may increase. This can increase the lithium recovery rate and reduce the amount of wastewater generated.

The temperature of the process water recovered in step (h) may be 5 °C to 45 °C, and more preferably 10 °C to 40 °C. Lithium bicarbonate has high solubility at low temperatures and low solubility at high temperatures. To dissolve a large amount of lithium in water, it is necessary to proceed with the process at a low temperature. The lower the temperature of the process water, the more advantageous it is to produce a high concentration solution.

The carbon dioxide water leaching process is preferably performed for a sufficient time so that the first lithium carbonate is sufficiently dissolved.

The reaction mechanism of the carbon dioxide ($CO_2$) water leaching process is as follows.

$$Li_2CO_3+CO_2+H_2O \rightarrow 2LiHCO_3$$

Lithium bicarbonate may exist in a dissolved state in the leached lithium bicarbonate solution.

Next, the leached lithium bicarbonate solution obtained in step (d) is filtered to separate solid and liquid to obtain a filtrate (hereinafter referred to as 'filtered lithium bicarbonate solution') (step e).

There still may exist scrap powder in the leached lithium bicarbonate solution obtained in step (d). The solid phase and the liquid phase can be separated by filtering the leached lithium bicarbonate solution using the Filter Press method. Lithium bicarbonate may exist in a dissolved state in the filtered lithium bicarbonate solution, Next, the filtered lithium bicarbonate solution obtained in step (e) can be purified using an ion exchange resin to prepare a purified solution (hereinafter referred to as 'purified lithium bicarbonate solution') (step f).

Impurities other than lithium present in the filtered lithium bicarbonate solution obtained in step (e) can be removed using an ion exchange resin and purified to a purity of 99.5% or more. By going through this process, high-purity lithium carbonate of more than 99.5% can be produced from the later process.

A polystyrene-based cation exchange resin can be used as an ion exchange resin. In this case, it is possible to treat about 120 to 150 liters of process water per liter of resin at a flow rate of 5 to 10 liters per hour.

In general, the coprecipitation method, which adjusts pH by using chemicals such as acids or alkalis, is widely used to remove impurities other than lithium. In this case, the amount of chemicals used is large and the amount of wastewater generated increases. Also, additional contamination of sodium (Na), etc., may occur depending on the chemical used. To solve these problems and to produce high-purity battery-grade lithium carbonate, it is necessary to only adsorb and remove ions of impurities other than lithium. Purification using an ion exchange resin may lead to process simplification by reducing the conventional washing process. The filtrate generated in step (h) can be reused as process water, thereby reducing the amount of wastewater generated and maximizing the lithium recovery rate.

Next, a second lithium carbonate can be synthesized through thermal decomposition of lithium bicarbonate by heating the purified lithium bicarbonate solution obtained in step (f) (step g).

Lithium carbonate produced through thermal decomposition of lithium bicarbonate can be referred to as a second lithium carbonate. The reaction mechanism for the synthesis of a second lithium carbonate through thermal decomposition of lithium bicarbonate is as follows.

$$2LiHCO_3 \rightarrow Li_2CO_3+CO_2+H_2O$$

The synthesized second lithium carbonate may be dissolved in a solvent and exist as a solution or may precipitate and exist in a solid phase. When going through this process, lithium bicarbonate solution, second lithium carbonate solution, and solid second lithium carbonate may exist together.

This is referred to as a second lithium carbonate solution considering that high-purity solid second lithium carbonate is formed.

Thermal decomposition can be achieved at a temperature of 80~100 °C. Since the solubility of the second lithium carbonate decreases as the temperature increases, the recovery rate of the second lithium carbonate can be increased as the synthesizing process of the second lithium carbonate by thermal decomposition of lithium bicarbonate is performed at a higher temperature.

Referring to FIG. 2 shows that the synthesis efficiency of the second lithium carbonate is low below 70 °C, and as the temperature rises, the synthesis efficiency of the second lithium carbonate increases. It can be confirmed that even at 100 °C, the synthesis efficiency reaches 100%. Synthesis efficiency can be calculated as the ratio of 'concentration of lithium recovered from raw materials at each temperature' to 'concentration of lithium recoverable at room temperature based on raw materials'.

The thermal decomposition process may be performed with stirring, and the stirring speed may be 60 to 400 rpm.

The second lithium carbonate solution may include a lithium bicarbonate solution, a second lithium carbonate solution, and a solid second lithium carbonate.

Next, the second lithium carbonate solution prepared in step (g) is filtered to obtain a solid second lithium carbonate, and the liquid second lithium carbonate filtrate can be recovered (step h).

The solid second lithium carbonate can be dried using a dryer to remove moisture to obtain high purity battery grade second lithium carbonate with a final purity of 99.5% or more. The drying temperature may be 100 °C to 300 °C.

The second lithium carbonate filtrate can be recovered and reused as process water in steps (c) and (d). Since the second lithium carbonate filtrate contains some lithium, when the filtrate is reused as process water, the lithium concentration in the lithium bicarbonate solution leached in step (d) can be increased, thereby increasing the lithium recovery rate and reducing the amount of wastewater generated.

Hereinafter, the present invention will be described in detail through examples. However, the present invention is not limited to the examples.

1. Preparation of Lithium-Ion Secondary Battery Scrap Powder

Lithium-ion secondary battery scrap powder is obtained from batteries or cells of waste lithium-ion secondary batteries. Table 1 shows the results of the component analysis of lithium-ion secondary battery scrap powder using high-frequency inductively coupled plasma (ICP-MS).

TABLE 1

| (unit) | Li | Ni | Co | Mn | Mg | Ca | Zn | Cu | Fe | Na | Al |
|---|---|---|---|---|---|---|---|---|---|---|---|
| | | % | | | | | | ppm | | | |
| concentration | 3.74 | 25.22 | 4.59 | 2.06 | 236 | 284 | 11 | 3,805 | 1,650 | 537 | 9,828 |

2. Roasting

A mixture of scrap powder and activated carbon was placed in a rotary kiln and a roasting process was performed at a temperature of 800±5 °C for 200 minutes. After the isothermal section was completed, the roasted product was obtained by cooling for about 400 minutes. Nitrogen (N2) gas was flowed from the temperature increase section to the isothermal section to maintain a nitrogen atmosphere. The nitrogen flow rate was set at 50 LPM (Liter Per Minute). The nitrogen atmosphere was not maintained in the cooling section.

3. Wet Grinding

Wet ball milling was performed by adding the roasted powder, 93% alumina balls, and process water to the mill. The temperature was maintained at 25 °C to 30 °C. Wet ball milling was carried out for 360 minutes.

4. Carbon Dioxide (CO2) Water Leaching and Filtration

Process water at 25 °C was added to the wet grinding result, and a carbon dioxide water leaching process was performed using a stirrer while adding carbon dioxide gas through aeration. After sufficient leaching, a leached lithium bicarbonate solution was obtained. Then, it was filtered using a Filter Press to obtain a filtered lithium bicarbonate solution. The results of the component analysis of the filtrate are shown in Table 2.

Table 2 also shows the components of the leach filtrate, which was obtained by filtrating the leachate obtained by the conventional water leaching method (a method of transforming lithium carbonate into highly soluble lithium chloride or lithium hydroxide using hydrochloric acid or sulfuric acid into the wet grinding result (Korean Patent No. 10-1682217)).

TABLE 2

| (unit) | Li | Ni | Co | Mn | Mg | Ca | Zn | Cu | Fe | Na | Al |
|---|---|---|---|---|---|---|---|---|---|---|---|
| | | | | | ppm | | | | | | |
| (conventional method) | 8,650 | 798 | 308 | 1,110 | 9 | 4 | 1 | 0 | 13 | 2,550 | 36 |
| (present invention) | 9,610 | 407 | 78 | 43 | 2 | 5 | 0 | 0 | 0 | 32 | 0 |

Referring to Table 2 shows that in the case of the carbon dioxide (CO2) water leaching method according to the present invention, the content of impurities in the filtrate is significantly lower than that in the case of the conventional water leaching method.

5. Purification Using Ion Exchange Resin

The filtered lithium bicarbonate solution was purified using a polystyrene-based cation exchange resin at a flow rate of 5 to 10 liters per hour by adsorbing the target component cations to the resin. The results of the component analysis of the purified lithium bicarbonate solution obtained after purification are shown in Table 3.

TABLE 3

| (unit) | Li | Ni | Co | Mn | Mg | Ca | Zn | Cu | Fe | Na | Al |
|---|---|---|---|---|---|---|---|---|---|---|---|
| | ppm | | | | | | | | | | |
| Before purification | 9,610 | 407 | 78 | 43 | 2 | 5 | 0 | 0 | 0 | 32 | 0 |
| After purification | 9,420 | 0 | 0 | 0 | 1 | 2 | 0 | 0 | 0 | 30 | 0 |

Referring to Table 3, it shows that more than 99.5% of nickel, cobalt, and manganese, excluding lithium, were removed.

6. Lithium Carbonate Synthesis and Filtration Through Thermal Decomposition

Lithium carbonate was synthesized by thermal decomposition of the purified lithium bicarbonate solution while stirring at a temperature of 100 °C. The lithium carbonate solution was filtered and separated into solid lithium carbonate and lithium carbonate filtrate.

The solid lithium carbonate was dried at a temperature of 130 °C to finally obtain high purity battery-grade lithium carbonate.

Lithium carbonate filtrate can be reused as process water in the wet grinding process and carbon dioxide water leaching process. The ICP analysis results for the lithium carbonate filtrate are shown in Table 4.

TABLE 4

| (unit) | Li | Ni | Co | Mn | Mg | Ca | Zn | Cu | Fe | Na | Al |
|---|---|---|---|---|---|---|---|---|---|---|---|
| | ppm | | | | | | | | | | |
| filtrate | 2,280 | 0 | 0 | 0 | 1 | 1 | 0 | 0 | 0 | 25 | 0 |
| Soft water | 0 | 0 | 0 | 0 | 0 | 0 | 0 | 0 | 0 | 65 | 0 |

Referring to Table 4 shows that the lithium carbonate filtrate according to the present invention contains lithium and impurity content at the same level as soft water. Therefore, lithium carbonate filtrate according to the present invention can be used as process water instead of soft water. When lithium carbonate filtrate is reused as process water, it can have the effect of increasing the concentration of lithium when manufacturing lithium bicarbonate solution, ultimately increasing the recovery rate of lithium and drastically reducing the amount of wastewater by reusing wastewater without discharging it. Whereas, in general, soft water is used as process water and then discharged as wastewater.

Table 5 shows the purity of lithium carbonate obtained by a conventional process in which sodium carbonate is added after hydrochloric acid or sulfuric acid leaching to remove residues and synthesize lithium carbonate (Korean Patent No. 10-1682217), and the carbon dioxide water leaching process according to the present invention. The purity of lithium carbonate was shown in comparison.

TABLE 5

| (unit) | $Li_2CO_3$ % | Ni | Co | Mn | Mg | Ca | Zn | Cu | Fe | Na | Al | Si |
|---|---|---|---|---|---|---|---|---|---|---|---|---|
| | | ppm | | | | | | | | | | |
| Battery Spec | ≥99.5 | 30 | 0 | 10 | 50 | 20 | 5 | 5 | 5 | 250 | 10 | 30 |
| (conventional process) | 99.1 | 0 | 0 | 0 | 75 | 45 | 2 | 0 | 2 | 243 | 3 | 20 |
| (present invention) | 99.8 | 0 | 0 | 0 | 0 | 1 | 0 | 0 | 0 | 30 | 0 | 8 |

Referring to Table 5 shows that in the case of the conventional process, the purity of lithium carbonate is 99.1%, and in the case of the present invention, the purity of lithium carbonate is 99.8%. The purity specification of lithium carbonate for battery-grade lithium carbonate is specified to be 99.5% or higher, and the lithium carbonate according to the present invention satisfies this specification. In addition, it shows that the levels of impurities such as Mg, Ca, and Na, which are mainly managed, have been significantly reduced, and all of them meet the battery specifications. Therefore, it can be confirmed that the lithium carbonate produced according to the present invention can be immediately used as a material for lithium-ion secondary batteries' cathode material.

FIG. 3 shows the results of the XRD analysis of finally obtained lithium carbonate according to one aspect of the present invention, and FIG. 4 shows the results of the XRD analysis of battery-grade lithium carbonate extracted from lithium minerals.

Referring to FIGS. 3 and 4 show that the XRD diffraction peaks for finally obtained lithium carbonate according to one aspect of the present invention and the battery-grade lithium carbonate extracted from minerals match. Therefore, it can be confirmed that lithium carbonate produced by recovering lithium from lithium-ion secondary battery scrap according to one aspect of the present invention is the same as pure battery-grade lithium carbonate.

FIGS. 5A, 5B, and 5C show scanning electron microscope (SEM) photographs of finally obtained lithium carbonate according to one aspect of the present invention.

The terms used in the present invention are intended to describe specific embodiments and are not intended to limit the present invention. Unless it is clear from the context, singular expressions should be considered to have a plural meaning. Terms such as "include" or "have" mean that the features, numbers, steps, operations, components, or combinations thereof described in the specification exist, but are not intended to exclude them.

The present invention is not limited by the above-described embodiments and the attached drawings but is intended to be limited by the attached claims. Accordingly, various substitutions, modifications, and changes may be made by those skilled in the art without departing from the technical spirit of the present invention as set forth in the claims, and these should also be considered to fall within the scope of the present invention.

What is claimed is:

1. A method of producing high-purity lithium carbonate by recovering lithium from lithium-ion secondary battery scrap, comprising:

(1) a process of roasting lithium-ion secondary battery scrap powder by maintaining it at 600 °C to 1,000 °C for 100 to 300 minutes in a reducing atmosphere;

(2) a process of wet grinding the roasted product at 25 °C to 30 °C;

(3) a process of converting a first lithium carbonate into lithium bicarbonate by water leaching the wet grinding result while adding carbon dioxide to produce a leached lithium bicarbonate solution in which the lithium bicarbonate is dissolved;

(4) a process of filtering the leached lithium bicarbonate solution to produce a filtered lithium bicarbonate solution;

(5) a process of purifying the filtered lithium bicarbonate solution using a polystyrene-based ion exchange resin at a flow rate of 5 to 10 liters per hour to remove impurities other than lithium to produce a purified lithium bicarbonate solution;

(6) a process of synthesizing a second lithium carbonate by thermally decomposing the lithium bicarbonate in the purified lithium bicarbonate solution at a temperature of 80 to 100 °C while stirring at 60 to 400 rpm; and (7) a process of filtering a second lithium carbonate solution containing the second lithium carbonate and separating the second lithium carbonate solution into a solid phase second lithium carbonate and a liquid phase second lithium carbonate filtrate.

2. A method of claim 1, wherein reusing the second lithium carbonate filtrate as process water in steps (2) and (3).

3. A method of claim 2, wherein the temperature of the process water is 5 °C to 45 °C.

4. A method of claim 1, wherein the purity of the solid second lithium carbonate is 99.5% or more.

5. A high-purity lithium carbonate produced according to claim 1.

* * * * *